United States Patent
Lin (10) Patent No.: US 11,741,149 B2
(45) Date of Patent: Aug. 29, 2023

(54) SERVER STORAGE MANAGEMENT SYSTEM CAPABLE OF GENERATING RACK LOCATION MAP

(71) Applicant: Wistron Corporation, New Taipei (TW)

(72) Inventor: Chun-Chih Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 322 days.

(21) Appl. No.: 15/927,001

(22) Filed: Mar. 20, 2018

(65) Prior Publication Data
US 2019/0197127 A1 Jun. 27, 2019

(30) Foreign Application Priority Data

Dec. 25, 2017 (TW) .................................. 106145463

(51) Int. Cl.
*G06F 16/44* (2019.01)
*G06F 3/06* (2006.01)
*H04L 43/0817* (2022.01)

(52) U.S. Cl.
CPC .......... *G06F 16/444* (2019.01); *G06F 3/0604* (2013.01); *G06F 3/0653* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 6,393,484 B1 * | 5/2002 | Massarani | H04L 29/12018 709/225 |
| 7,642,914 B2 | 1/2010 | Campbell | |
| 2009/0070697 A1 * | 3/2009 | LaForest | H04L 41/22 715/772 |
| 2009/0196290 A1 * | 8/2009 | Zhao | H04L 61/2015 370/392 |
| 2013/0091255 A1 * | 4/2013 | Jai | H04L 61/5014 709/220 |
| 2013/0166713 A1 * | 6/2013 | Chiu | H04L 61/103 709/223 |
| 2014/0055240 A1 * | 2/2014 | Couvee | G06F 11/324 340/6.1 |
| 2015/0200818 A1 * | 7/2015 | Winkelstrater | H04L 41/12 709/223 |
| 2018/0364795 A1 * | 12/2018 | Li | G06F 16/23 |

FOREIGN PATENT DOCUMENTS

CN 102143220 A 8/2011

* cited by examiner

*Primary Examiner* — Thu N Nguyen
(74) *Attorney, Agent, or Firm* — Winston Hsu (57) ABSTRACT

A storage server management system includes a management database for storing rack data and storage server data, wherein the rack data includes rack identifications and coordinates of multiple storage servers and the storage server data includes media access control addresses, model name and rail identifications of the multiple storage servers, multiple racks for containing the multiple storage servers, a dynamic host configuration protocol server for configuring the internet protocol addresses to the multiple storage servers, and a management console for generating a rack location map according to the rack data and the storage server data.

15 Claims, 7 Drawing Sheets

SERVER STORAGE MANAGEMENT SYSTEM CAPABLE OF GENERATING RACK LOCATION MAP

BACKGROUND OF THE INVENTION

1. Field of the Invention

The present invention relates to a storage server management system, and more particularly, to a storage server management system capable of generating rack location map to store in management database.

2. Description of the Prior Art

As technology advances, data generated by a computer system grows to bring the demand of more storage servers. How to manage the storage servers in the data center is always a challenge in the industry. In practice, one data room of a big data center may contain multiple racks, each rack may contain hundreds of storage devices (e.g., hard drive); in other words, one data room may contain more than one thousand storage devices. Once a management system of the data center detected one malfunction hard drive, how to find out the malfunction hard drive from the data room is a challenge to an operator.

A common solution is that a management program transmit a control signal when the malfunction hard drive is detected to control a server connected to the malfunction hard drive emitting a warning light, and the operator finds out the server emitting the warning light in the data room. However, the management program does not provide a specific location of the server, when there are more servers in the data room, it takes more time to find out the server, which is inconvenient for management and repair of the data center.

In addition, the management program does not provide a model information of the malfunction hard drive, when there are multiple malfunction hard drives with different models, mistake may happen. For example, given that the data center contains servers A and B, wherein the server A is adapted only to a hard drive with brand X, while the server B is adapted only to a hard drive with brand Y. When both the servers A and B have to be replaced and show the warning light at the same time, the operator may replace the wrong hard drives to the servers A and B.

Another common solution is that the operator may use hard coding to input the location and model information of the hard drives in a database, and the management program may read them from the database. However, this causes expansion and dynamical adjustment issues to the data center. e.g., the current management program manages only the device (including the server and hard drives) contained in one rack, it requires another management system to handle a new added rack in the data center.

Therefore, there is a need to provide a storage server management system for managing the storage servers of the management data.

SUMMARY OF THE INVENTION

It is therefore an objective of the present to provide a storage server management system for configured to automatically draw a rack location map and store it in the management database.

The present invention discloses a storage server management system storage server management system includes a management database, multiple storage servers, multiple racks, a DHCP (Dynamic Host Configuration Protocol) server, a first switch, and a management console. The management database is configured to store rack data and storage server data. The multiple storage servers are corresponding to multiple MAC (Media Access Control) addresses, respectively. The multiple racks are configured to dispose the multiple storage servers. The DHCP server is configured to establish a local area network for managing the storage server management system, and dynamically configure IP (Internet protocol) addresses to the multiple storage servers logged in to the local area network. The first switch is connected to the DHCP server and the management database. The multiple second switches are connected to the first switch. The management console is connected to the DHCP server and the management database, connected to the management database and the multiple second switches through the first switch, and configured to generate a rack location map according to the rack data and the storage server data.

The management console of the present invention may automatically draw the rack location map and store it in the management database. When an equipment (storage server or corresponding hard drives) is detected to be malfunction, the management console may read the location and related model information of the malfunction equipment from the management database according to the MAC address of the malfunction equipment and display the location and related model information on the location map, which allows the operator to quickly find out the malfunction equipment according to the location map and related model information to repair it.

In a first embodiment, the operator may manually input coordinates of the racks and information of the storage servers to manually establish the rack data and the storage server data. In a second embodiment, operator may manually establish the rack data, and storage server management system may automatically establish the storage server data by using the smart switch (second switch). In a third embodiment, by installing Internet of things device to the rack and the second switch, the storage server management system may automatically establish the rack data and the storage server data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
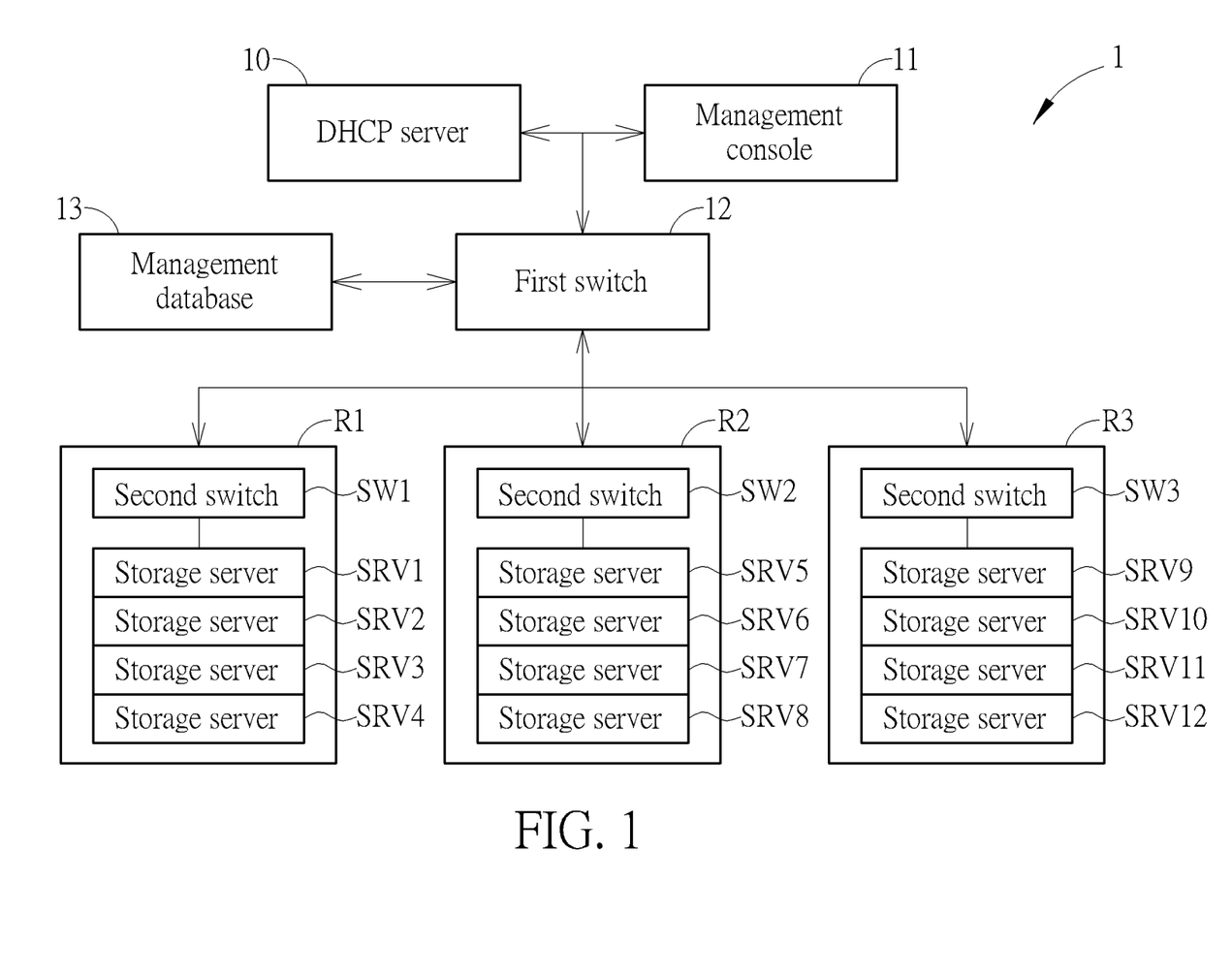
FIG. 1 is a functional block diagram of a storage server management system according to an embodiment of the present invention.

FIG. 1 is a functional block diagram of a storage server management system 1 according to an embodiment of the present invention. The storage server management system 1 includes a Dynamic Host Configuration Protocol (hereinafter abbreviated DHCP) server 10, a management console 11, a first switch 12, a management database 13, multiple second switches SW1, SW2 and SW3, multiple racks R1, R2 and R3, and multiple storage servers SRV1-SRV12.

There are second switches SW1, SW2 and SW3 and multiple storage servers SRV1-SRV12 disposed in the rack R1, R2 and R3, respectively. For example, there are the second switch SW1 and the storage servers SRV1-SRV4 disposed in the rack R1, there are the second switch SW2 and the storage servers SRV5-SRV8 disposed in the rack R2, and there are the second switch SW3 and the storage servers SRV9-SRV12 disposed in the rack R3.

Figure 2:
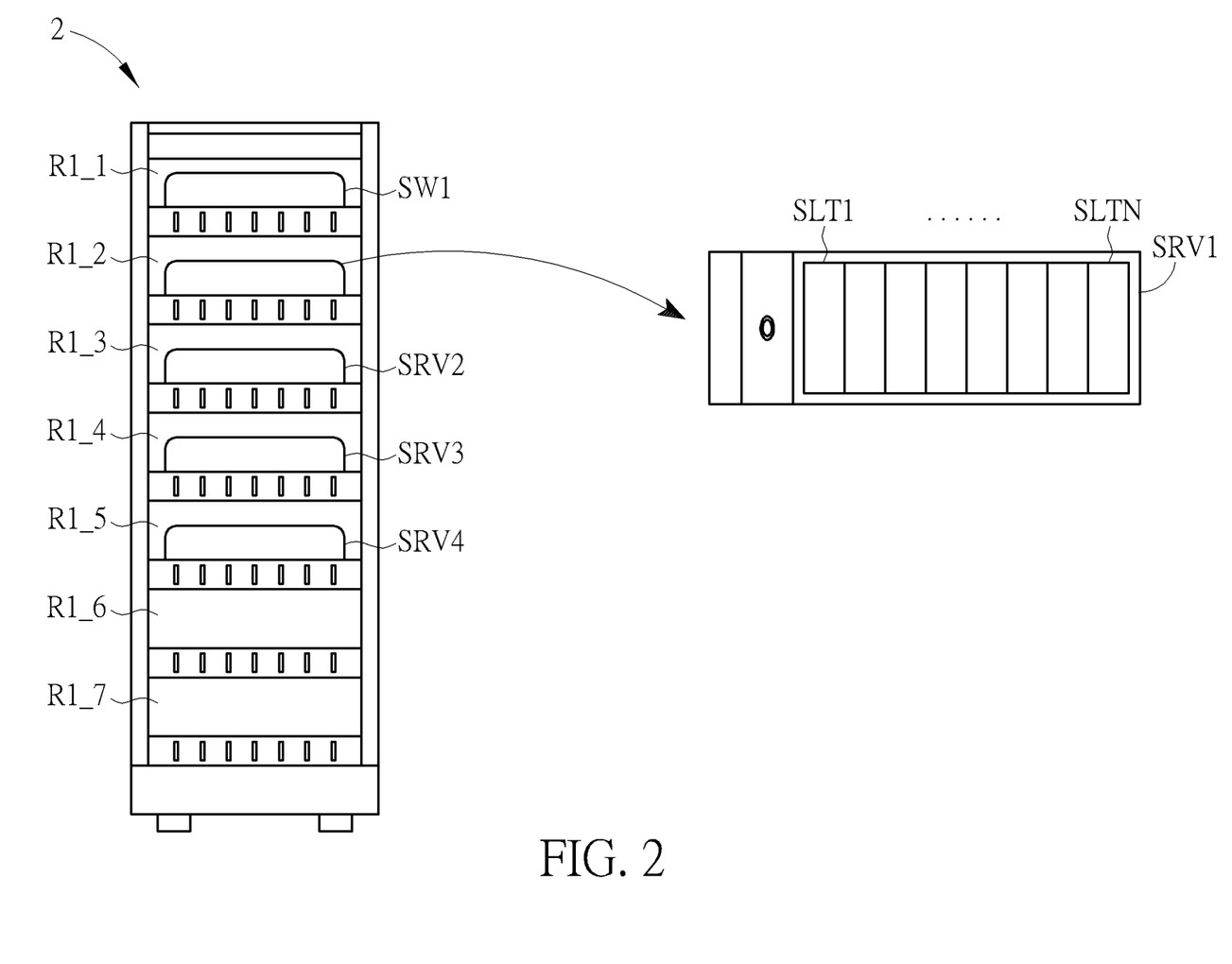
FIG. 2 is a schematic diagram of a rack and a storage server according to an embodiment of the present invention.

FIG. 2 is a schematic diagram of the rack R1 and the storage server SRV1 according to an embodiment of the present invention. Configurations of the rack R1, R2 and R3 are the same, take the rack R1 for example in this embodiment. The rack R1 includes multiple containing spaces, which respectively corresponds to rails R1_1, R1_2, R1_3, R1_4, R1_5, R1_6, and R1_7 (wherein rail IDs (identities) are numbers 1-7). The second switch SW1 may be disposed in the rail R1_1, and the storage servers SRV1-SRV4 may be respectively disposed in the rails R1_2, R1_3, R1_4, and R1_5. The storage server SRV1 includes multiple storage devices (e.g., N hard drives), wherein one of the storage devices is respectively disposed in slots SLT1-SLTN of the storage server SRV1 (wherein slot IDs are numbers 1-N). The slot ID is a unique identity written in a system chip by a server maker, and used to recognize the location of a Non-Volatile Memory Express (hereinafter abbreviated NVMe) drive.

As shown in FIG. 1, the second switch SW1 may connect to the second switches SW2 and SW3 and the first switch 12, and connect to the management console 11, the management database 13 and the DHCP server 10 through the first switch 12, and connect to the storage servers SRV5-SRV12 through the second switches SW2 and SW3. In one embodiment, numbers of the rack, the server and the second switch may by any integers without limitation.

The DHCP server 10 is configured to manage a local area network of the storage server management system 1, and connect to the management console 11 and the first switch 12 to dynamically configure internet protocol (hereinafter abbreviated IP) addresses to the storage servers SRV1-SRV12. Each of the storage servers SRV1-SRV12 corresponds to unique Media Access Control (hereinafter abbreviated MAC) address. For example, when the storage servers SRV1-SRV12 log in to the local area network through the second switches SW1, SW2 and SW3, and the first switch 12, the DHCP server 10 may dynamically configure IP addresses to the storage servers SRV1-SRV12.

The first switch 12 is connected to the DHCP server 10, the management console 11, the management database 13 and the second switches SW1, SW2 and SW3, and configured to transmit a query command and a corresponding query response. For example, the management console 11 may transmit the query command to the second switches SW1, SW2 and SW3 through the first switch 12 to query machine information (e.g., MAC address and product name of the storage server) corresponding to ports of the switch.

The management database 13 may store rack data (e.g., rack identifications and corresponding coordinates) and storage server data (e.g., server ID and corresponding MAC address, model name and rail ID of the storage server). The management console 11 is connected to the DHCP server 10 and the first switch 12, and configured to transmit the query command to the second switches SW1, SW2 and SW3 through the first switch 12 according to the storage server IP address provided by the DHCP server 10; then, the management console 11 may connect to the second switch SW1, SW2 or SW3 corresponding to the storage server to receive the MAC address of the storage server (i.e., query response); finally, the management console 11 may read information associated with the storage server data from the management database 13 through the first switch 12 according to the MAC address of the storage server.

Therefore, the management console 11 may draw location map of the racks R1, R2 and R3 according to the rack data and the storage server data stored in the management database 13 to display the location map onto a Graphical User Interface (GUI), and store the location map in the management database 13. The management console 11 may periodically examine and collect operating statues of all storage servers, when an equipment malfunction is detected (e.g., a storage server or a hard drive is malfunction), the management console 11 may read the location and the related model information from the management database 13 according to the MAC address corresponding to the malfunction equipment, and display on the GUI. As a result, the operator may quickly find out the malfunction equipment to repair it according to the location map and the related model information, which is benefit for management and repair of the data center. In addition, management console 11 may detect new added storage servers, storage devices and corresponding racks, which is benefit for expansion of the data center.

In the first embodiment, an operator may manually enter the rack coordinates and the storage server information to manually establish the rack data and the storage server data. In the second embodiment, the operator may manually establish the rack data, and the storage server management system may automatically establish the storage server data by using the smart switch (second switch). In the third embodiment, by installing Internet of Things (IoT) devices in the rack and the second switch, the storage server management system may automatically establish the rack data and the storage server data.

Figure 3:
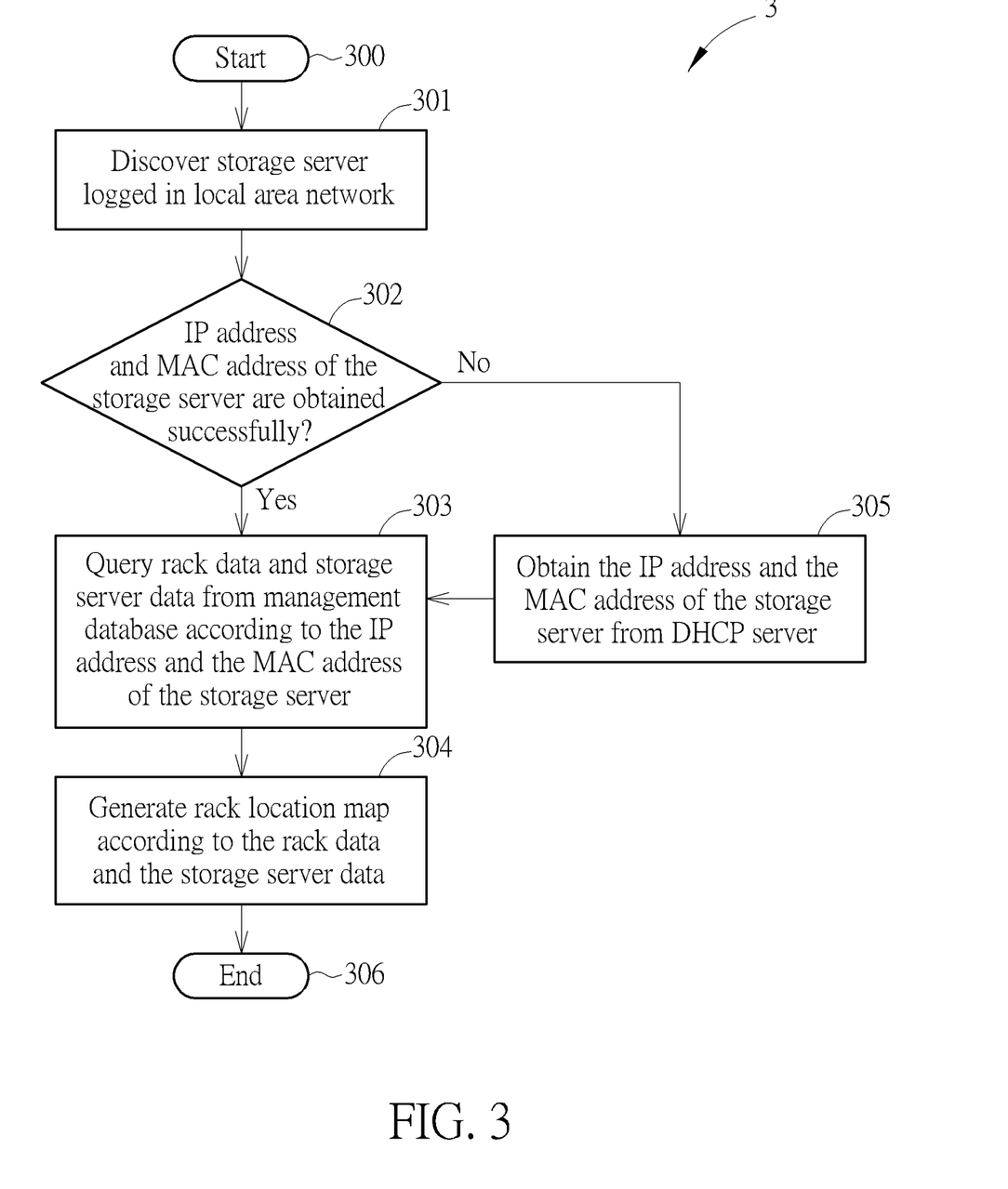
FIG. 3 is a flowchart of a process according to a first embodiment of the present invention.

FIG. 3 is a flowchart of a process 3 according to an embodiment of the present invention. The process 3 may be utilized in the storage server management system 1 and executed by the management console 11, wherein the process 3 includes the following steps.

Step 300: Start.

Step 301: Discover a storage server logged in a local area network.

Step 302: Determine whether an IP address and a MAC address of the storage server are obtained successfully? Go to Step 303 if yes; go to Step 305 if no.

Step 303: Query rack data and storage server data from a management database according to the IP address and the MAC address of the storage server.

Step 304: Generate a rack location map according to the rack data and the storage server data.

Step 305: Obtain the IP address and the MAC address of the storage server from a DHCP server. Return to Step 303.

Step 306: End.

In the process 3, the management console 11 may execute a discovery procedure to detect the storage server (e.g., storage servers SRV1-SRV12) logged in the local area network (Step 301). When the management console 11 successfully obtains the IP address and the MAC address of the storage server obtain logged in the local area network (yes of Step 302), the management console 11 may query the rack data and the storage server data from management database 13 according to the storage server IP address and MAC address (Step 303); then, the management console 11 may generate the rack location map according to the rack data and the storage server data, (Step 304). On the contrary, when the management console 11 cannot obtain the IP address and the MAC address of the storage server logged in the local area network (no of Step 302), the management console 11 may query the IP address and the MAC address of the storage server from the DHCP server (Step 305), so as to obtain the rack data and the storage server data to generate the rack location map (Step 303 and Step 304).

As a result, by executing the process 3, the management console 11 may automatically draw the location map of the rack and store in the management database 13. When an equipment (storage server or corresponding hard drives) is detected to be malfunction, the management console 11 may read the location and related model information of the malfunction equipment from the management database 13 according to the MAC address of the malfunction equipment and display the location and related model information on the location map, which allows the operator to quickly find out the malfunction equipment according to the location map and related model information to repair it.

In the first embodiment, the first switch 12 and the second switches SW1, SW2 and SW3 may be a Network switch. In addition, the operator may manually input the rack identifications and corresponding coordinates in the management database 13 to establish the rack data, as shown in Table 1-1. Moreover, the operator may manually input the server ID and the corresponding rack ID, the MAC address, the rail ID and the server information in the management database 13 to establish the server data, as shown in Table 1-2.

TABLE 1-1

Rack data

| Rack ID | Coordinate |
|---|---|
| 1 | (X1, Y1) |
| 2 | (X2, Y2) |
| 3 | (X3, Y3) |

TABLE 1-2

Server data

| Server ID | Rack ID | IP/MAC address | Rail ID | Server information |
|---|---|---|---|---|
| 1 | 1 | 00AABBCCDD00 | 1 | Brand D; model 1 |
| 2 | 1 | 00AABBCCDD01 | 2 | Brand H; model 4 |
| 3 | 1 | 00AABBCCDD02 | 3 | Brand I; model 6 |
| 4 | 1 | 00AABBCCDD03 | 4 | Brand A; model 2 |
| 5 | 2 | 00AABBCCDD04 | 1 | Brand D; model 1 |
| 6 | 2 | 00AABBCCDD05 | 2 | Brand H; model 4 |
| 7 | 2 | 00AABBCCDD06 | 3 | Brand I; model 6 |
| 8 | 2 | 00AABBCCDD07 | 4 | Brand A; model 2 |
| 9 | 3 | 00AABBCCDD08 | 1 | Brand D; model 1 |
| 10 | 3 | 00AABBCCDD09 | 2 | Brand H; model 4 |
| 11 | 3 | 00AABBCCDD0A | 3 | Brand I; model 6 |
| 12 | 3 | 00AABBCCDD0B | 4 | Brand A; model 2 |

For example, once the location map has been established, if the storage device with the MAC address "00AABBCCDD03" is detected to be malfunction, the management console 11 may obtain the information including the server ID "3", the rack identifications "1", the rail ID "4", the server information "brand I; model 6" and the coordinate (X1, Y1) from the management database 13, and display the information to the operator by a Graphical User Interface (GUI). Therefore, the operator may learn the information including the coordinate of the rack R1, the storage device is disposed in rail the R1_4, and the storage device is model 2 of brand A, so as to quickly find out the malfunction equipment to repair it. In one embodiment, the management console 11 may obtain the column "server ID" of Table 1-2 from an available service, e.g., System Management Basic Input Output System (SMBIOS).

Figure 4:
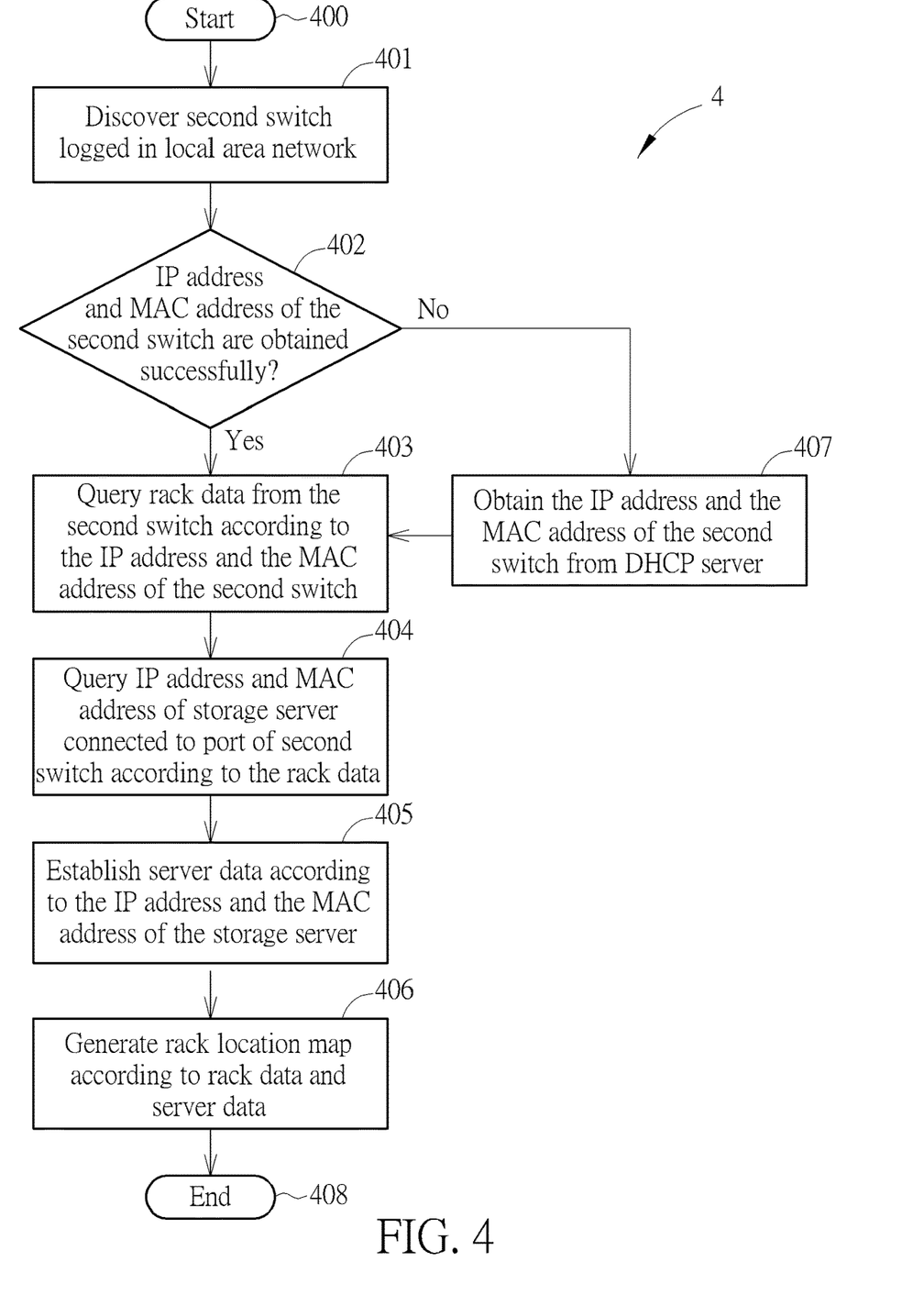
FIG. 4 is a flowchart of a process according to a second embodiment of the present invention.

FIG. 4 is a flowchart of a process 4 according to an embodiment of the present invention. The process 4 may be utilized in the storage server management system 1 and executed by the management console 11, wherein the process 4 includes the following steps.

Step 400: Start.

Step 401: Discover a second switch logged in a local area network.

Step 402: Determine whether an IP address and a MAC address of the second switch are obtained successfully? Go to Step 403 if yes; go to Step 407 if no.

Step 403: Query rack data from the second switch according to the IP address and the MAC address of the second switch.

Step 404: Query an IP address and a MAC address of a storage server connected to a port of second switch according to the rack data.

Step 405: Establish server data according to the IP address and the MAC address of the storage server.

Step 406: Generate a rack location map according to rack data and server data.

Step 407: Obtain the IP address and the MAC address of the second switch from a DHCP server. Return to Step 403.

Step 408: End.

In the process 4, the management console 11 may execute a discovery procedure to detect the second switch logged in the local area network and query the IP address and the MAC address (Step 401). When the management console 11 successfully obtained the IP address and the MAC address of the second switch (yes of Step 402), the management console 11 may query the rack data from the second switch according to the IP address and the MAC address of the second switch (Step 403); the management console 11 may query the IP address and the MAC address of the storage server connected to the port of the second switch according to the rack data (Step 404); the management console 11 may establish the server data according to the IP address and the MAC address of the storage server (Step 405); finally, the management console 11 may generate the rack location map according to the rack data and the server data (Step 406). On the contrary, when management console 11 cannot obtain the IP address and the MAC address of the second switch (no of Step 402), the management console 11 may query the IP address and the MAC address of the second switch from the DHCP server (Step 407) to obtain the rack data and the server data to generate the rack location map (Step 403-406).

In the second embodiment, the first switch 12 may be a general network switch, the second switches SW1, SW2 and SW3 may be an Internet switch or a smart switch. Since every port of the Internet switch corresponds a unique IP address and a unique MAC address, the operator must connect the storage server installed in a rail to a port corresponding to the rail when adding a new rack, which allows the management console 11 to automatically establish the columns of "IP/MAC address" and "rail ID" in Table 1-2 (the server data). For example, the operator must connect the storage server installed in the rail R1_3 of the rack R1 to the first port of the second switch SW1, and connect the storage server installed in the rail R1_4 of the rack R1 to the second port of the second switch SW1, and so on.

The process 4 is different from the process 3 by using the smart switch along with the installation method of the rack (i.e., connect the storage server installed in the rail to the corresponding port), the management console 11 may automatically establish the server data (e.g., Table 1-2), while the operator manually inputs the rack identifications and the corresponding coordinates to the management database 13 to establish the rack data (e.g., Table 1-1). Therefore, the process 4 allows the management console 11 to automatically establish the server data to simplify works of the system manager and the operator. As a result, through executing the process 4, the management console 11 may automatically draw the location map of the rack and store it in the management database 13.

Figure 5:
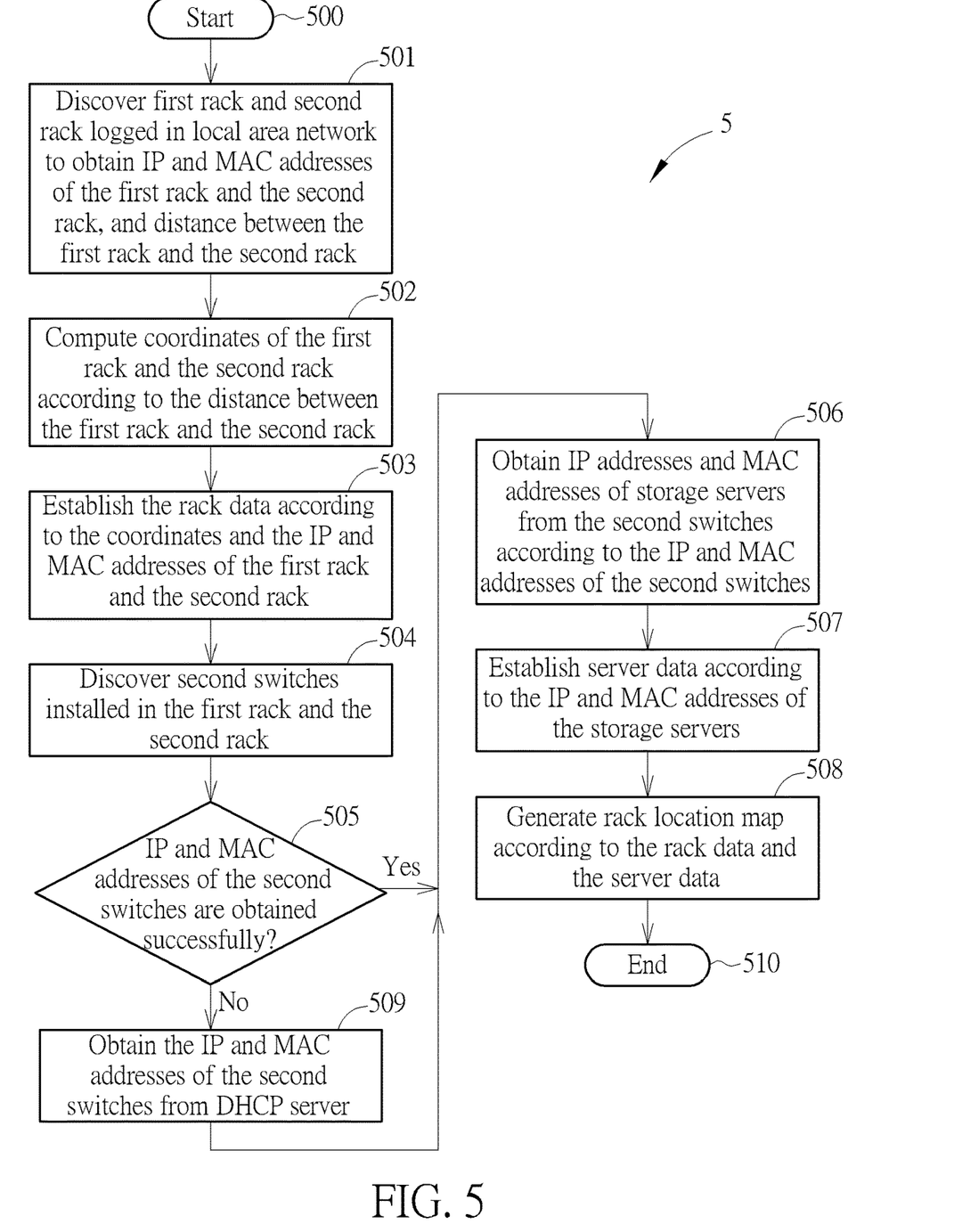
FIG. 5 is a flowchart of a process according to a third embodiment of the present invention.

FIG. 5 is a flowchart of a process 5 according to the third embodiment of the present invention. The process 5 may be utilized in the storage server management system 1, and include the following steps.

Step 500: Start.

Step 501: Discover a first rack and a second rack logged in a local area network to obtain IP and MAC addresses of the first rack and the second rack, and a distance between the first rack and the second rack.

Step 502: Compute coordinates of the first rack and the second rack according to the distance between the first rack and the second rack.

Step 503: Establish the rack data according to the coordinates and the IP and MAC addresses of the first rack and the second rack.

Step 504: Discover second switches installed in the first rack and the second rack.

Step 505: Determine whether IP and MAC addresses of the second switches are obtained successfully? Go to Step 506 if yes; go to Step 509 if no.

Step 506: Obtain IP addresses and MAC addresses of storage servers from the second switches according to the IP and MAC addresses of the second switches.

Step 507: Establish server data according to the IP and MAC addresses of the storage servers.

Step 508: Generate a rack location map according to the rack data and the server data.

Step 509: Obtain the IP and MAC addresses of the second switches from a DHCP server. Return to Step 506.

Step 510: End.

In the process 5, the management console 11 may execute a discovery procedure to obtain the IP and MAC addresses of the first rack and the second rack (e.g., the first rack R1 and the second rack R2) and the distance between the first rack and the second rack (Step 501). The management console 11 may compute coordinates of the first rack and the second rack according to the distance between the first rack and the second rack (Step 502); the management console 11 may establish the rack data according to the coordinates of the first rack and the second rack and the IP and MAC addresses of the second switches installed in the first rack and the second rack (Step 503), and store it in the management database 13. Then, the management console 11 may transmit query commands to the first rack and the second rack to discover the IP and MAC addresses of the second switches installed in the first rack and the second rack (Step 504). When the management console 11 successfully obtained the IP addresses and the MAC addresses of the second switches logged in the local area network (yes of Step 505), the management console 11 may obtain the IP and MAC addresses of the storage servers from the second switches according to the IP and MAC addresses of the second switches (Step 506); the management console 11 may establish the server data according to the IP and MAC addresses of the storage servers (Step 507); finally, the management console 11 may generate the rack location map according to the rack data and the server data (Step 508). On the contrary, when the management console 11 cannot obtain the IP addresses and the MAC addresses of the second switches logged in the local area network (no of Step 505), the management console 11 may query the IP addresses and the MAC addresses of the second switches from the DHCP server (Step 509) to obtain the server data, and generate the rack location map according to the rack data and the server data (Step 506-508).

In the third embodiment, the first switch 12 may be a general network switch, the second switches SW1, SW2 and SW3 may be an Internet switch or a smart switch. The racks R1, R2 and R3 and the second switches SW1, SW2 and SW3 may be disposed with devices such Internet of Things (IoT) devices, radio-frequency (RF) ID devices or iBeacon communication devices that is capable of measuring distance, absolute location or relative location, which is not limited in the present invention. The functionality of IoT device includes: (1) measuring the distance between two IoT devices; (2) having unique identification (UID); (3) communication capability to read the IP and MAC addresses of the storage server, the server information, the IP and MAC addresses of the switch, and to transmit the distance to a connected IoT device.

In one embodiment, since the second switches SW1, SW2 and SW3 are respectively installed in the racks R1, R2 and R3, the coordinates of the racks R1, R2, and R3 may be obtained by the IoT devices disposed in the second switches SW1, SW2 and SW3.

The process 5 is specialized in that there are IoT devices disposed in the second switches SW1, SW2 and SW3, and the racks R1, R2 and R3 to detect relative distances between each other, so the management console 11 may compute the coordinates of the rack accordingly to automatically establish the rack data (e.g., Table 1-1). Meanwhile, by the installation method of the rack performed by the operator (i.e., connect the storage server installed in the rail to the corresponding port), the management console 11 may connect to the second switches SW1, SW2 and SW3 to obtain the data of the connected storage servers, so as to automatically establish the server data (e.g., Table 1-2). Therefore, the process 5 allows the management console 11 to automatically establish the rack data and the server data to simplify the words of the system manager and the operator. As a result, through execute process 5, management console 11 may automatically draw the rack location map and store it in the management database 13.

Figure 6:
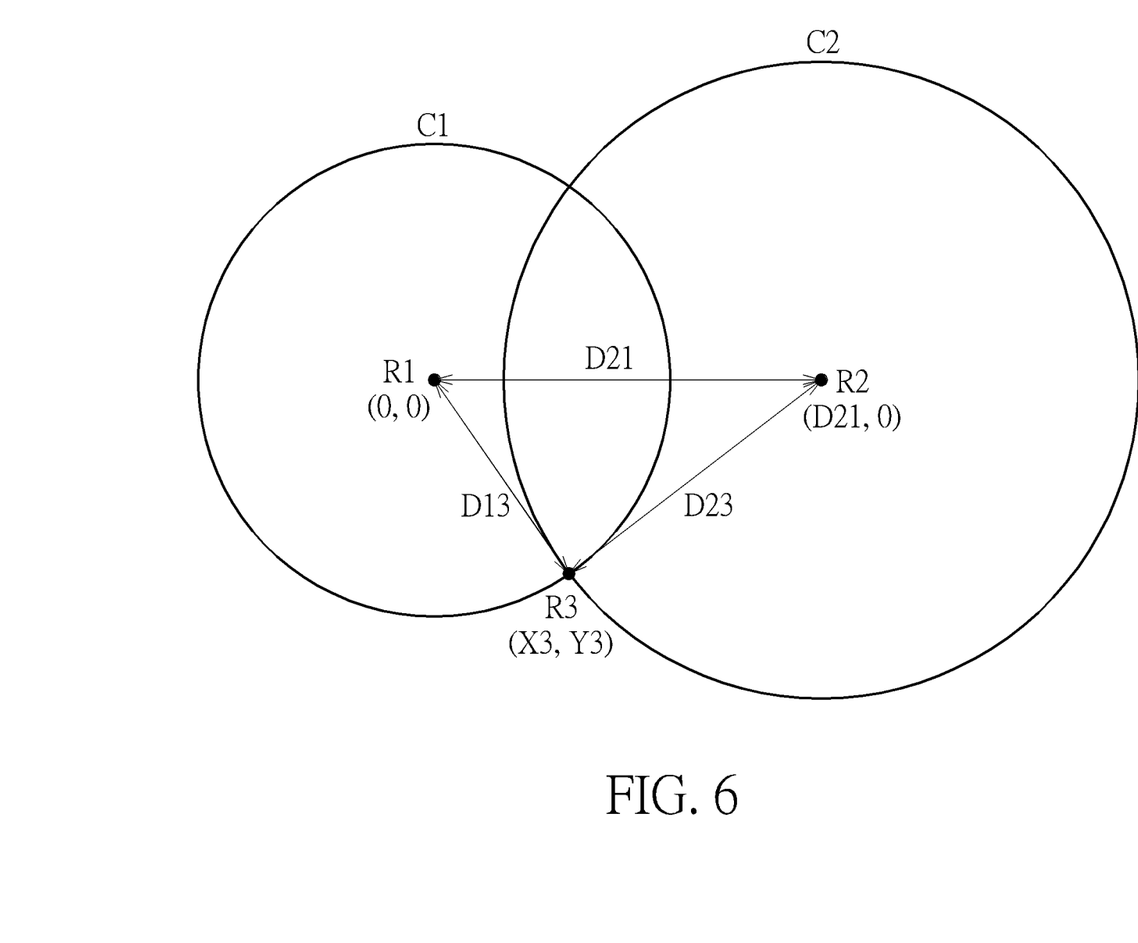
FIG. 6 and FIG. 7 are schematic diagrams of rack location map generated by the management console.
Figure 7:
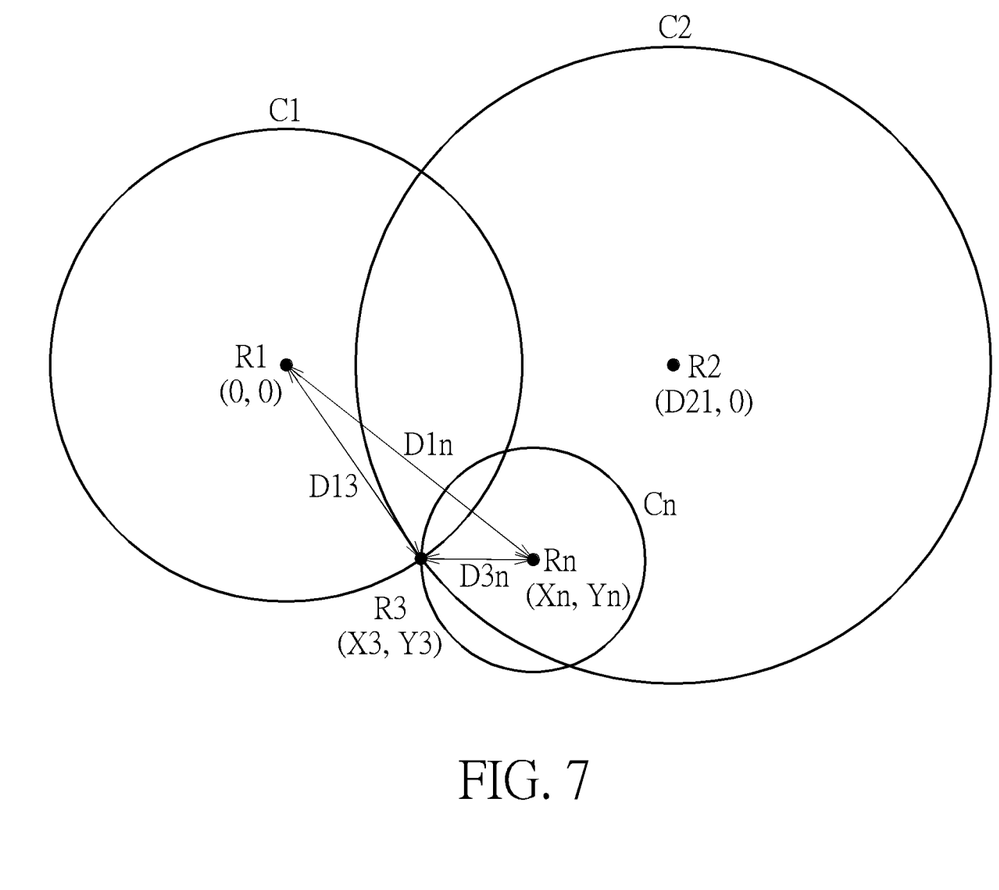

FIG. 6 and FIG. 7 are schematic diagrams of the rack location map computed by the management console 11. The IoT devices disposed in the racks R1, R2 and R3 may detect relative distances between each other to generate the following Table 2-1, Table 2-2, and Table 2-3, wherein DXY denotes a relative distance from a rack X to a rack Y.

TABLE 2-1

Relative distance generated by IoT device of rack R1

| IoT device ID | Switch MAC address | R1 Distance | R2 Distance | R3 Distance |
| --- | --- | --- | --- | --- |
| R1-UID | 0000AABB00 | N/A | D12 | D13 |

TABLE 2-2

| | Relative distance generated by IoT device of rack R2 | | | |
|---|---|---|---|---|
| IoT device ID | Switch MAC address | R1 Distance | R2 Distance | R3 Distance |
| R2-UID | 0000AABB11 | D21 | N/A | D23 |

TABLE 2-3

| | Relative distance generated by IoT device of rack R3 | | | |
|---|---|---|---|---|
| IoT device ID | Switch MAC address | R1 Distance | R2 Distance | R3 Distance |
| R3-UID | 0000AABBxx | D31 | D32 | N/A |

When the management console 11 is executing the discovery procedure to search any IoT devices logged in the local area network, the management console 11 may connect to all the IoT devices to read the relative distances and related data generated by all the IoT devices (i.e., Table 2-1, 2-2, 2-3). The management console 11 may execute an algorithm according to the relative distance to compute relative coordinates of the racks R1, R2 and R3, as shown in FIG. 6, wherein the algorithm includes the following steps.

(A) Take the coordinate of the rack R1 as an origin (0, 0) and the coordinate of rack R2 as (D21, 0);

(B) Make a circle C1 by a center being the coordinate of the rack R1 and a radius being the distance D13;

(C) Make a circle C2 by a center being the coordinate of the rack R2 and a radius being the distance D23; and (D) Compute a point of intersection R3 (X3, Y3) between the circles C1 and C2 to obtain the coordinate of the rack R3, wherein there are two points of intersection between the circles C1 and C2, any one of them is valid for the algorithm.

In one embodiment, if the storage server management system 1 further includes a rack Rn, the management console 11 may follow the steps (A)-(D) to compute a coordinate of the rack Rn according to relative distances between the racks R1, R3 and Rn. As shown in FIG. 7, the management console 11 may set a predetermined coordinate of the rack Rn to be (D1n, 0); make a circle C1 by a center of the rack R1 and a radius of a distance D13; make a circle Cn by a center of the rack Rn and a radius of a distance D3n; compute an intersection point R3' (X3', Y3') of the circles C1 and Cn; and convert the predetermined coordinate (D1n, 0) of the rack Rn into a coordinate (Xn, Yn) according to the intersection point R3' (X3', Y3') and the coordinate (X3, Y3) of the rack R3.

Therefore, the management console 11 may compute all the coordinates of the racks R1, R2 and R3 based on the algorithm to establish the rack data (as shown in Table 3-1) and store them in the management database 13 to be read according to any query command.

TABLE 3-1

| | | Rack data | | | |
|---|---|---|---|---|---|
| IoT Device ID | Switch MAC address | R1 Distance | R2 Distance | R3 Distance | Coordinate |
| R1-UID | 0000AABB00 | N/A | D12 | D13 | (0, 0) |
| R2-UID | 0000AABB11 | D21 | N/A | D23 | (D21, 0) |
| R3-UID | 0000AABBxx | D31 | D32 | N/A | (X3, Y3) |

Noticeably, a "coordinate" column in Table 3-1 denotes relative coordinates, a skilled person in the art shall adjust a view angle of the rack location map based one his or her view angle. For example, the management console 11 may execute a program that allows the skilled person to manually adjust the view angle of the rack location map, or predetermine at least two reference points according to coordinate of data room.

To sum up, the management console of the present invention may automatically draw the rack location map and store it in the management database. When an equipment (storage server or corresponding hard drives) is detected to be malfunction, the management console may read the location and related model information of the malfunction equipment from the management database according to the MAC address of the malfunction equipment and display the location and related model information on the location map, which allows the operator to quickly find out the malfunction equipment according to the location map and related model information to repair it.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage server management system, comprising:
a management database configured to store rack data and storage server data;
multiple storage servers corresponding to multiple MAC (Media Access Control) addresses, respectively;
multiple racks configured to dispose the multiple storage servers;
a DHCP (Dynamic Host Configuration Protocol) server configured to establish a local area network for managing the storage server management system, and dynamically configure IP (Internet protocol) addresses to the multiple storage servers logged in to the local area network;
a first switch connected to the DHCP server and the management database;
multiple second switches connected to the first switch; and
a management console connected to the DHCP server and the management database, connected to the management database and the multiple second switches through the first switch, and configured to generate a rack location map according to the rack data and the storage server data;
wherein when IP addresses and MAC addresses of the multiple second switches logged in the local area network are not obtained, the management console queries and obtains the IP addresses and the MAC addresses of the multiple second switches from the DHCP server; and
when the IP addresses and the MAC addresses of the multiple second switches are obtained, the management console queries the rack data from the multiple second switches according to the IP addresses and the MAC addresses of the multiple second switches.

2. The management system of claim 1, wherein the rack data comprises rack identifications of the multiple storage server and coordinates of the multiple storage server, and the storage server data comprises the MAC addresses, model names and rail IDs of the multiple storage server.

3. The management system of claim 1, wherein the first switch and the multiple second switches are general network switches.

4. The management system of claim 3, wherein the management console is configured to execute a process to generate the rack location map, the process comprises:
discovering the multiple storage servers logged in the local area network;
determining whether the IP addresses and the MAC addresses of the multiple storage servers are obtained to obtain the rack data and the storage server data; and
generating the rack location map according to the rack data and the storage server data.

5. The management system of claim 4, wherein determining whether the IP addresses and the MAC addresses of the multiple storage servers are obtained to obtain the rack data and the storage server data comprises:
when the IP addresses and the MAC addresses of the multiple storage servers are not obtained, obtaining the rack data and the storage server data from the DHCP server; and
when the IP addresses and the MAC addresses of the multiple storage servers are when the IP addresses and the MAC addresses of the multiple storage servers are obtained, querying the rack data and the storage server data from the management database according to the IP addresses and the MAC addresses of the multiple storage servers.

6. The management system of claim 1, wherein the first switch is a network switch, the multiple second switches are Internet switches, and the multiple racks and the multiple second switches are respectively disposed with Internet of Things (IoT) devices.

7. The management system of claim 6, wherein the management console is configured to execute a process to generate the rack location map, the process comprises:
discovering the multiple second switches logged in the local area network;
querying the IP addresses and the MAC addresses of the multiple storage servers connected to ports of the multiple second switches from the multiple second switches according to the rack data;
establishing the server data according to the IP addresses and the MAC addresses of the multiple storage servers; and
generating the rack location map according to the rack data and the server data.

8. The management system of claim 6, wherein the management console is configured to execute a process to generate the rack location map, and the process comprises:
discovering the first rack and the second rack logged in the local area network to obtain IP addresses and MAC addresses of the first rack and the second rack, and a distance between the first rack and the second rack;
computing coordinates of the first rack and the second rack according to the distance between the first rack and the second rack;
establishing the rack data according to the coordinates, the IP addresses and the MAC addresses of the first rack and the second rack;
discovering the multiple second switches disposed in the first rack and the second rack;
determining whether the IP addresses and the MAC addresses of the multiple second switches are obtained to obtain the IP addresses and the MAC addresses of the multiple storage servers;
establishing the server data according to the IP addresses and the MAC addresses of the multiple storage servers; and
generating the rack location map according to the rack data and the server data.

9. The management system of claim 8, wherein determining whether the IP addresses and the MAC addresses of the multiple second switches are obtained to obtain the IP addresses and the MAC addresses of the multiple storage servers comprises:
when the IP addresses and the MAC addresses of the multiple second switches are not obtained, obtaining the IP addresses and the MAC addresses of the multiple second switches from the DHCP server; and
when the IP addresses and the MAC addresses of the multiple second switches when the IP addresses and the MAC addresses of the multiple second switches are obtained, obtaining the IP addresses and the MAC addresses of the multiple storage servers from the multiple second switches according to the IP addresses and the MAC addresses of the multiple second switches.

10. The management system of claim 8, wherein the first rack and the second rack are respectively disposed with IoT devices configured to detect the distance between the first rack and the second rack.

11. The management system of claim 8, wherein an IoT device corresponding to the second switch disposed in the first rack and an IoT device corresponding to the second switch disposed in the second rack are configured to detect the distance between the first rack and the second rack.

12. The management system of claim 1, wherein the multiple racks comprises a first rack and a second rack, the multiple second switch comprises a third switch and a fourth switch, the multiple storage server comprises multiple first storage servers and multiple second storage servers, wherein the first rack is disposed with the third switch and the multiple first storage servers, and the second rack is disposed with the fourth switch and the multiple second storage servers.

13. The management system of claim 12, wherein the third switch comprises multiple ports, the multiple first storage servers are respectively connected to the multiple ports, the first rack comprises multiple containing spaces, the multiple containing spaces are respectively corresponding to multiple rail IDs, and the multiple first storage servers are respectively disposed in the multiple containing spaces.

14. The management system of claim 1, wherein the management console is configured to periodically detect and collect operating status of the multiple storage servers, when the operating status indicates that there is at least one of the multiple storage servers is malfunction, the management console reads the store rack data and the storage server data corresponding to the at least one of the multiple storage servers from the management database according to an IP address and a MAC address of the at least one of the multiple storage servers.

15. The management system of claim 1, wherein the management database is configured to store the rack location map.

* * * * *